B. P. JENKS.
SERVING DISH.
APPLICATION FILED SEPT. 6, 1917.
1,265,338.
Patented May 7, 1918.
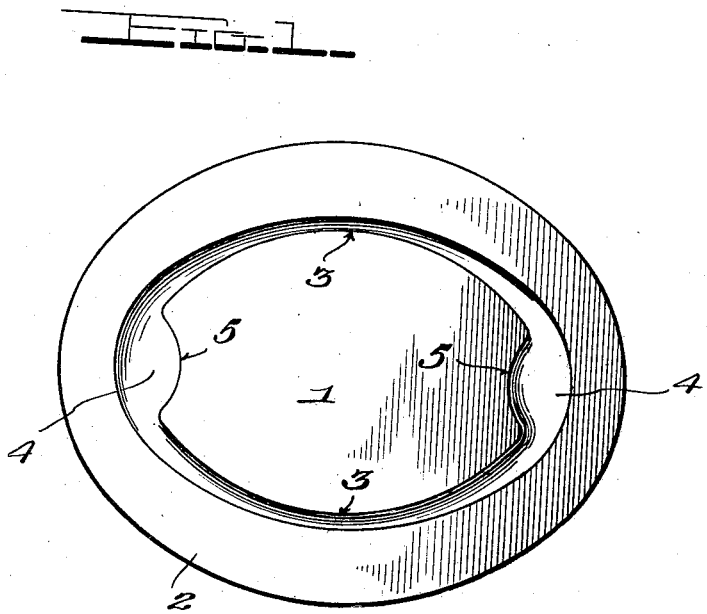
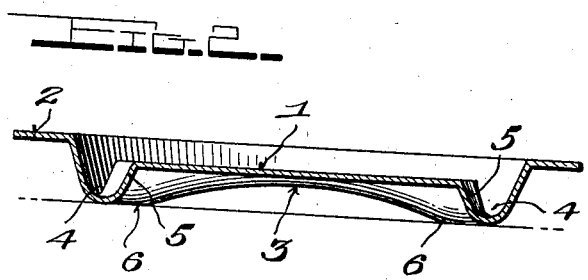
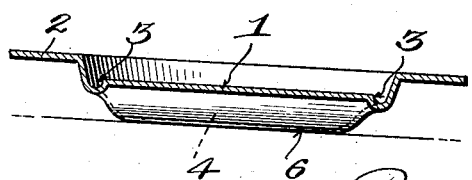
Inventor
Barton P. Jenks
By Joseph H. Miller
Attorney

UNITED STATES PATENT OFFICE.

BARTON P. JENKS, OF PROVIDENCE, RHODE ISLAND, ASSIGNOR TO GORHAM MANUFACTURING COMPANY, OF PROVIDENCE, RHODE ISLAND, A CORPORATION OF RHODE ISLAND.

SERVING-DISH.

1,265,338.

Specification of Letters Patent.   Patented May 7, 1918.

Application filed September 6, 1917.   Serial No. 190,016.

*To all whom it may concern:*

Be it known that I, BARTON P. JENKS, a citizen of the United States, residing at Providence, in the county of Providence and State of Rhode Island, have invented a new and useful Improvement in Serving-Dishes, of which the following is a specification.

This invention relates to certain new and useful improvements in serving dishes, and the primary object of the invention is to provide a dish of this character which has a central support for the meat and a gravy receptacle at each end of the dish so as to confine the gravy in the pockets, also to provide means to cause the gravy to flow into the pockets so as to enable all of the same to be easily removed from the dish.

A further object of the invention is to provide a dish possessed of the foregoing advantages and which also affords a firm and substantial footing so as to prevent tilting of the dish.

Further and other objects will be later set forth and manifested in the course of the following description.

In the drawings—

Figure 1 is a top plan view of the invention.

Fig. 2 is a central longitudinal sectional view, and

Fig. 3 is a central transverse sectional view.

The dish is formed to have a platform or raised part 1 which provides a meat support, and preferably a rim 2 which in outline corresponds to that of the dish proper. While an oval shaped dish is depicted in the drawings, it will be understood that other shapes may be used equally as well.

A channel 3 is formed on each side of the dish, preferably by shaping the dish as depicted in the drawings. These channels have their highest parts at the points indicated by the arrow heads of Fig. 1 and thence incline downwardly at their ends in opposite directions and merge into the gravy receptacles or pockets 4 formed at each end of the dish. In this manner it will be apparent that gravy and juices draining from the meat or otherwise entering the channels will be caused to gravitate into the pockets, thus enabling the gravy to be readily and easily removed, and at the same time to enable all of the gravy to be used, since same will always tend to flow toward the pockets throughout the time the dish is in use.

As shown in Fig. 1 of the drawings, the ends of the meat support 1 are bowed or curved inwardly at 5 so as to provide enlargements, which together with the ends of the channels form the gravy pockets enabling a spoon or ladle to be easily placed in the pockets to remove the gravy therefrom.

It will also be apparent from the foregoing that since the bottoms of the pockets 4, as shown in Fig. 3, extend throughout practically the entire bottom part of the dish, firm and substantial footings are provided preventing accidental tilting of the dish in use. The bottoms of the channels 3 at their deepest portions assist in the latter stated advantage, since as shown in Fig. 2, the parts 6—6 of the bottoms of the channels form side feet, or seats which engage the table or the like and assist the bottoms of the pockets 4 in preventing tilting of the dish.

It will thus be apparent from the foregoing that the gravy will always gravitate to the pockets, and that juice draining from the meat will enter the pockets, or entering the channels will be carried by the latter into the pockets. The dish also has end supports and side supports, the latter extending out from the end supports thus forming substantially U-shaped supports or feet at each of the ends of the dish.

Having thus described my invention, what I claim as new and desire to secure by Letters Patent is—

In a serving dish, a body having a raised central meat supporting platform and having a channel surrounding the platform, and a gravy pocket at each of the ends of the dish, the bottoms of the gravy pockets extending in the plane of the bottom of the channel at the ends of the latter, said channels each having divergent bottoms extending from the transverse center of the platform and leading into the respective pockets.

In testimony I have signed my name to this specification in the presence of two subscribing witnesses.

BARTON P. JENKS.

Witnesses:
ADA E. HAGERTY,
J. A. MILLER.

Copies of this patent may be obtained for five cents each, by addressing the "Commissioner of Patents, Washington, D. C."